Feb. 17, 1942.  A. F. McFARLAND  2,273,125
SPRAYER
Filed Sept. 9, 1940
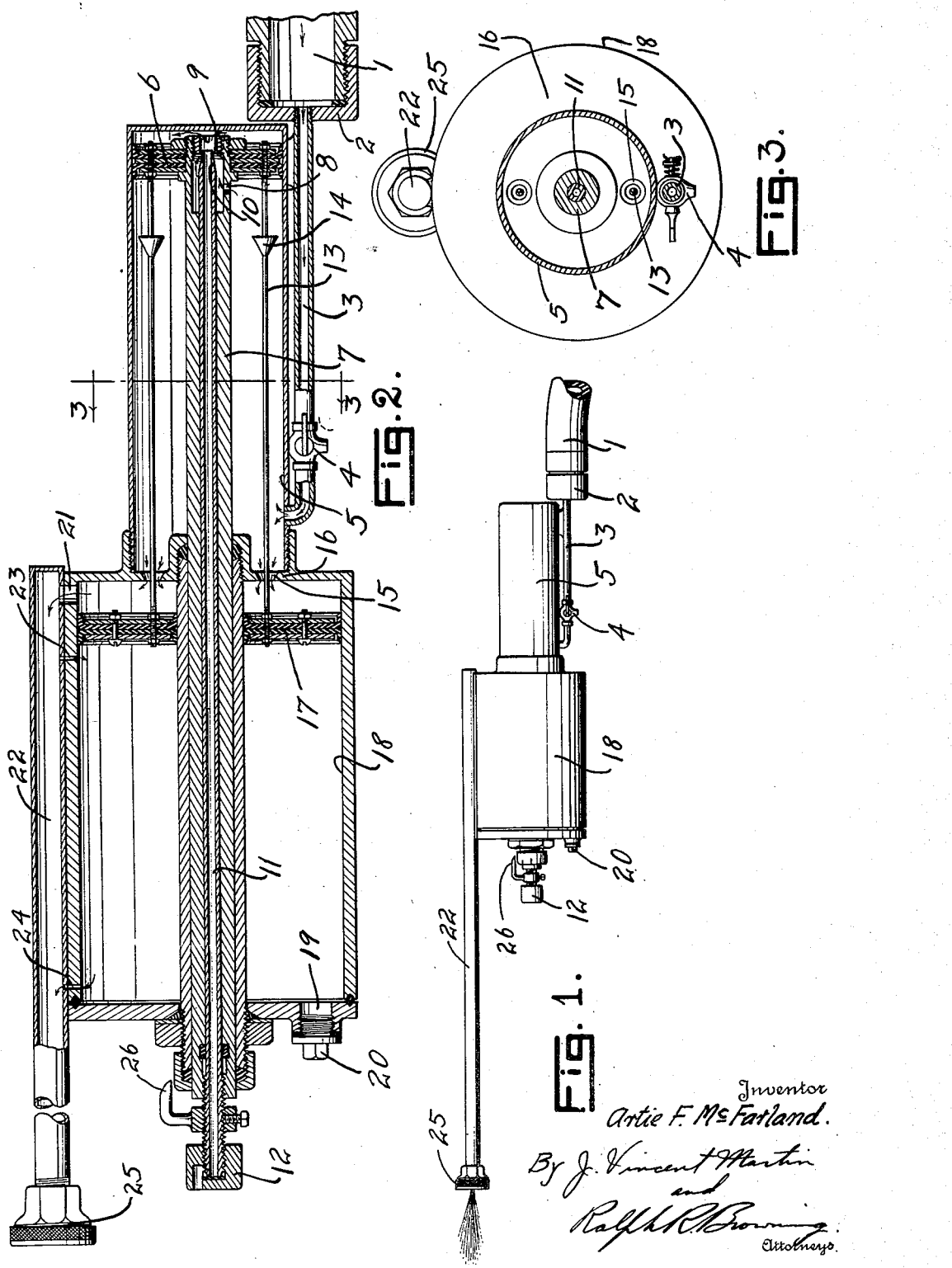
Inventor
Artie F. McFarland.
By J. Vincent Martin
and
Ralph R. Browning
Attorneys.

Patented Feb. 17, 1942

2,273,125

UNITED STATES PATENT OFFICE 2,273,125

SPRAYER

Artie F. McFarland, Houston, Tex.

Application September 9, 1940, Serial No. 355,929

6 Claims. (Cl. 299—85)

This invention relates to a device whereby a chemical solution may be sprayed in such proportions as may be desired, such device being ordinarily employed in spraying shrubs, flowers, etc.

It is an object of this invention to provide such a device which may be attached to an ordinary garden hose or other source of water under pressure and which will mix the chemical with the flowing stream of water in such proportions as may be desired. It is a further object to provide such a device which will automatically shut off when the supply of chemical has been exhausted.

It will, of course, be understood that the device may be used for mixing a flowing stream of some liquid other than water with some desired chemical, if such a mixture is found desirable.

In the drawing:

Fig. 1 is a side elevation of a device constructed in accordance with this invention.

Fig. 2 is a longitudinal cross section through the same.

Fig. 3 is a transverse cross section through the same, taken along the line 3—3 of Fig. 2.

In the drawing 1 indicates a garden hose or other source of water supply to which is threaded a cap 2, which in turn carries a smaller pipe 3. Interposed in this pipe is a drain cock 4, which may be opened to permit air to pass from the hose at the beginning of the operation. This drain cock is also of a nature so that it may be used to shut off the water flowing through the pipe 3. The pipe 3 communicates at this end with the interior of a cylinder 5 having a piston 6 therein. This piston 6 is mounted on a hollow piston rod 7 having an opening 8 from the interior of the cylinder to the interior of the piston rod adjacent the piston. This opening leads through the piston and intermediate its ends is provided with a needle valve seat 9, with which a hollow needle valve 10 cooperates. This needle valve 10 is on a valve rod 11 extending entirely through the piston rod 7 and rotatable from its outer end so as to adjust the opening past the needle valve. The valve rod 11 is also hollow and is normally closed with a cap 12 at its outer end. This cap may be opened as and when desired for a purpose presently to be set forth.

Connected to the piston 6 and extending therefrom through the cylinder 5 are a plurality of rods 13 having valves 14 thereon adapted when the piston 6 is moved to its extreme left hand position to seat against and close the openings 15. The openings 15 are in the head 16 of the cylinder 5 and the rods 13 extend through this head and are rigidly connected to a piston 17 within a second and larger cylinder 18. The cylinder 18 is adapted to contain the chemical to be mixed with the flowing stream of liquid and is provided with an opening 19 through which it may be filled, this opening normally being closed by a plug 20.

As the liquid from the cylinder passes through the openings 15 it is permitted to escape from the cylinder 18 through a lateral opening 21 into a discharge line 22. This discharge line also is connected with the interior of the cylinder 18 at two points 23 and 24 adjacent its opposite ends for a purpose presently to be set forth. The discharge pipe 22 is provided on its outer end with a spray head 25.

In operation, water or other liquid under pressure is fed in through the hose 1 and the pipe 3 into the cylinder 5. The major portion of this liquid passes through the openings 15 and 21 into the discharge 22 and out through the spray head 25. A minor portion of the liquid passes through the opening 8 and past the needle valve 10 into the space at the right of the piston 6 and this constant pressure upon the piston 6 tends to move it and the piston 17 to the left. It will be noted that the pressures on the opposite sides of the piston 6 will be substantially equalized but that the area on the right end of the piston 6 is greater than that on the left, so that the piston 6 will be moved to the left by this pressure.

At the beginning of the flow of liquid a small amount of liquid may pass into the cylinder 18 through the opening 23 until the piston 17 covers this opening. By this means any air plug left in this cylinder will be exhausted. Thereafter, as the pistons 6 and 17 move to the left, the chemical will be fed through the opening 24 into the flowing stream of liquid at a constant rate depending upon the pressure of the liquid. Thus, the proportions of the chemical mixture will remain constant during the flow of liquid. When the pistons 6 and 17 reach the left hand extremity of their movement, at which point the supply of chemical will be exhausted, the valves 14 will seat and close the openings 15 thus shutting off the flow of all liquid and preventing the flow of any liquid without the proper mixture of chemical.

The pointer 26 will indicate at all times the position of the needle valve 10. The opening of the needle valve will, of course, determine the speed of movement of the two pistons toward their left hand position and this speed of movement will determine the proportions of the chemical mixture. When the pistons have reached their left hand position, if the cap 12 be loosened that will permit the escape of the liquid which is in the space at the right of the piston 6, whereupon the unequalized pressure on the left of the piston 6 will cause both pistons to be moved back to their extreme right positions so that the cylinder 18 may again be filled with liquid.

It will be readily appreciated that the adjustment of the needle valve 10 will definitely regulate the rate of speed at which the water from the cylinder 5 passes to the right-hand side of the piston 6. By this regulation, therefore, the rate of speed of the piston 6 and of the piston 17, which feed the chemical, will be definitely limited and controlled.

It will further be apparent that the operation of the device described is not dependent upon a differential in pressure between the water supply through the hose 1 or the like and the outlet at the nozzle 25, but that it will operate just as well if the pressure at the nozzle is the same as that within the supply hose or pipe 1. This is because the movement of the two pistons does not depend upon a differential of pressure but upon a differential of area on the two sides of the piston 6 upon which that pressure acts. Thus, it will be seen that when the pressure on the two sides of the piston 6 is the same, the piston 6 will continue to move toward the left, as seen in Fig. 2, and to cause the feeding of the chemical because the area of the piston 6 which is exposed to the liquid pressure is greater on the right-hand side than on the left-hand side, as seen in Fig. 2.

For the reasons just stated, it is possible to employ the present device for the purpose of feeding chemical at a uniform rate into a flowing stream of liquid where there is no differential of pressure, as in the case where it is desired to inject chemical at a constant rate into a pipe line. In such case, the entire volume of liquid flowing through the pipe line might be caused to flow through the device illustrated and described in this application or the inlet and outlet of this device may both be connected to the pipe line at different points, the inlet being connected at a point in the pipe line upstream from the point at which the outlet is connected. With this arrangement the operation would be the same as above described except that the liquid flowing from the pipe line into this device would serve to move the pistons 6 and 17 and feed the chemical into the stream of liquid moving through the device, and this stream would then flow again into the pipe line. Of course, it will be seen that more liquid will be flowing into this chemical feeding device than will be flowing out of it, the difference being the volume of that portion of the piston rod 7 which is caused to project from the device, as the pistons move toward the left in the operation of the device.

Having described my invention, I claim:

1. In a chemical mixer, a chemical reservoir, means movable to feed chemical from said reservoir into a flowing stream of liquid, a piston connected to said chemical feeding means and movable to move said chemical feeding means in a direction to feed said chemical from said reservoir, a cylinder enclosing said piston, a piston rod connected to said piston and extending from one side thereof through one end of said cylinder whereby the effective area of one side of said piston is made smaller than that of the other side thereof, means for causing said flowing stream of liquid to pass through said cylinder on that side of said piston from which said rod extends, said means including an opening into and an opening from said cylinder, and a restricted by-pass through said piston whereby liquid from said flowing stream may pass from one side of said piston to the other to cause said piston to move and feed said chemical into the flowing stream.

2. In a chemical mixer, a chemical reservoir, means movable to feed chemical from said reservoir into a flowing stream of liquid, a piston connected to said chemical feeding means and movable to move said chemical feeding means in a direction to feed said chemical from said reservoir, a cylinder enclosing said piston, a piston rod connected to said piston and extending from one side thereof through one end of said cylinder whereby the effective area of one side of said piston is made smaller than that of the other side thereof, means for causing said flowing stream of liquid to pass through said cylinder on that side of said piston from which said rod extends, said means including an opening into and an opening from said cylinder, a restricted by-pass through said piston whereby liquid from said flowing stream may pass from one side of said piston to the other to cause said piston to move and feed said chemical into the flowing stream, and means for adjusting the size of said restricted opening from the exterior of said device to adjust the rate of speed of said chemical.

3. In a chemical mixer, a chemical reservoir, means movable to feed chemical from said reservoir into a flowing stream of liquid, a piston connected to said chemical feeding means and movable to move said chemical feeding means in a direction to feed said chemical from said reservoir, a cylinder enclosing said piston, a piston rod connected to said piston and extending from one side thereof through one end of said cylinder whereby the effective area of one side of said piston is made smaller than that of the other side thereof, means for causing said flowing stream of liquid to pass through said cylinder on that side of said piston from which said rod extends, said means including an opening into and an opening from said cylinder, a restricted by-pass through said piston whereby liquid from said flowing stream may pass from one side of said piston to the other to cause said piston to move and feed said chemical into the flowing stream, and means for releasing the pressure on the side of said piston opposite said rod to cause said piston to be reset by the pressure of said liquid.

4. In a chemical mixer, a chemical reservoir, means movable to feed chemical from said reservoir into a flowing stream of liquid, a cylinder attached to and aligned with the reservoir, a piston in said cylinder, means for subjecting both sides of said piston to the pressure of said flowing stream of liquid, one side of said piston having an effective pressure subjected area less than that of the other side thereof whereby a differential force will be applied to the piston displacing it with its smaller area side leading, means connecting said piston to the chemical feeding means, and means for releasing the pressure of said flowing stream on the large area side of the piston to retract the chemical feeding means.

5. In a chemical mixer, a chemical reservoir, means movable to feed chemical from said reservoir into a flowing stream of liquid, fluid actuated displacing means connected to the chemical feeding means for moving said chemical feeding means, means for subjecting said displacing means to opposed forces of different values both produced by the pressure of the flowing stream of fluid to effect a differential displacement thereof, and means for reducing the larger of said forces to a value below that of the smaller to effect a reversed displacement of the chemical feeding means.

6. In a chemical mixer, a chemical reservoir, means movable to feed chemical from said reservoir into a flowing stream of liquid, fluid actuated displacing means connected to the chemical feeding means for moving said chemical feeding means, means for subjecting said displacing means to opposed forces of different values both produced by the pressure of the flowing stream of fluid to effect a differential displacement thereof, and means for reducing the pressure producing the larger of said forces to reduce the larger force to a value less than the smaller force to effect a reversed displacement of the chemical feeding means.

ARTIE F. McFARLAND.